United States Patent [19]

Togo et al.

[11] Patent Number: 4,792,403
[45] Date of Patent: Dec. 20, 1988

[54] METHOD OF REMOVING ORGANIC IMPURITIES FROM AQUEOUS SOLUTION OF HYDROGEN PEROXIDE

[75] Inventors: Shizuo Togo, Ichikawa; Yasuo Sugihara, Yokkaichi; Takaki Ikebe, Tokyo, all of Japan

[73] Assignee: Mitsubishi Gas Chemical Company, Inc., Tokyo, Japan

[21] Appl. No.: 80,013

[22] Filed: Jul. 31, 1987

[30] Foreign Application Priority Data

Aug. 6, 1986 [JP] Japan ................................. 61-183369

[51] Int. Cl.$^4$ .............................................. C01B 15/02
[52] U.S. Cl. .................................... 210/692; 423/584
[58] Field of Search ................ 423/584, 582, 585–591; 210/660, 661, 670, 676, 679, 681, 692, 691, 690

[56] References Cited

U.S. PATENT DOCUMENTS 3,294,488 12/1966 Dunlop et al. ......................... 23/207
3,990,844 11/1976 Cormany ............................. 210/660
4,279,883 7/1981 Izumi et al. ......................... 423/584

FOREIGN PATENT DOCUMENTS 1539843 8/1968 France .
46-26095 7/1971 Japan .
59-89311 5/1984 Japan .

Primary Examiner—Frank Sever
Attorney, Agent, or Firm—Wenderoth, Lind & Ponack

[57] ABSTRACT

A method of removing organic impurities from an aqueous solution of hydrogen peroxide, which comprises bringing an aqueous solution of hydrogen peroxide containing organic impurities into contact with a halogen-containing porous resin having a true specific gravity in the wet state of 1.1 to 1.3.

8 Claims, No Drawings

METHOD OF REMOVING ORGANIC IMPURITIES FROM AQUEOUS SOLUTION OF HYDROGEN PEROXIDE

This invention relates to a method of purifying hydrogen peroxide by removing organic impurities contained in an aqueous solution of hydrogen peroxide.

Hydrogen peroxide is extensively used, for example, for bleaching and chemical polishing. In recent years, its use in the fields of washing silicon wafers in the production of semiconductors has increased, and with it, there has been a demand for hydrogen peroxide having an extremely high purity.

Presently, a method involving autoxidation is by far most used for hydrogen peroxide production. Hydrogen peroxide produced by this method contains tiny amounts of organic impurities. Usually, an aqueous solution of hydrogen peroxide in a practical concentration of 10 to 70% by weight contains 20 to several hundred milligrams/liter of organic impurities as the total amount of organic carbon.

A method known heretofore for removing these impurities from an aqueous solution of hydrogen peroxide comprises treating hydrogen peroxide containing organic impurities at a temperature of not more than 40° C. with a resin having a network molecular structure and containing no ion exchange group which is obtained by polymerizing styrene and crosslinking the product with divinylbenzene (see Japanese Patent Publication No. 26095/1971 and U.S. Pat. No. 3,294,488).

Industrially, however, the use of the conventional adsorbent resin in an attempt to remove organic impurities from an aqueous solution of hydrogen peroxide gives rise to various problems. For example, since this adsorbent resin has a small adsorptive capacity, it must be very often subjected to regeneration treatment during use. This is uneconomical, and troublesome in operation. In the treatment of removing the organic impurities on an industrial scale, it is the general practice to employ a column procedure having excellent operability and a high removing efficiency. When the above conventional resin is packed in a column and an aqueous solution of hydrogen peroxide having a practical concentration of 10 to 70% by weight is passed through it as a downward flow, the resin comes afloat in the upper portion of the column because the resin has too low a specific gravity. As a result, a shortcut flow occurs and the removing efficiency is drastically reduced. By passing the aqueous solution of hydrogen peroxide as an upward flow, it is possible to inhibit occurrence of short circuits to some extent, and increase the removing efficiency. This method also has the disadvantage that bubbles occurring at the time of passing the aqueous hydrogen peroxide solution are difficult to remove from the floating resin in the upper portion of the column.

It is an object of this invention to provide a novel method of removing organic impurities from an aqueous solution of hydrogen peroxide.

Another object of this invention is to provide a simple and convenient method of removing organic impurities from an aqueous solution of hydrogen peroxide with a high removing efficiency.

Still another object of this invention is to provide a method of removing organic impurities from an aqueous solution of hydrogen peroxide by adsorption with an adsorbent resin having a high specific gravity.

Further objects of this invention along with its advantages will become apparent from the following description.

According to this invention, these objects and advantages of the invention are achieved by a method of removing organic impurities from an aqueous solution of hydrogen peroxide, which comprises bringing an aqueous solution of hydrogen peroxide containing organic impurities into contact with a halogen-containing porous resin having a true specific gravity in the wet state of 1.1 to 1.3.

The resin used in the method of this invention is a halogen-containing porous resin which has a true specific gravity of 1.1 to 1.3 in the wet state.

The true specific gravity of the resin in the wet state is measured by a pycnometer in accordance with the following method. Deionized water is filled in the pycnometer to an indicator line, and the weight (Pw in grams) of the water is measured. The pycnometer is then dried, and a sample of the resin is accurately weighed (W" in grams) into the dried pycnometer. Then, deionized water is filled in this pycnometer to the indicator line, and the weight (Pwr in grams) of the water and resin is measured.

The true specific gravity D of the resin in the wet state is calculated in accordance with the following equation.

$$D = W''/V_w$$

where $W''$ is the weight (grams) of the resin whose specific gravity D is to be measured, and $V_w$ is the volume of water which the resin has displaced and is calculated from the following equation $$V_w = 1/d_w(P_w + W'' - P_{wr})$$

in which $d_w$ is the density of deionized water, $P_w$ is the weight of deionized water, and $P_{wr}$ is the weight of the resin and water.

Preferably, the resin used in this invention has a true specific gravity D in the wet state of 1.1 to 1.2. Desirably, its true specific gravity in the wet state is higher than the specific gravity of the aqueous hydrogen peroxide solution to be treated. If, however, this true specific gravity of the resin exceeds 1.3, its adsorptive ability generally decreases greatly, and liberation of halogen-containing impurities from the resin increases greatly.

The halogen-containing porous resin used in this invention may contain halogen in an amount of preferably about 10 to about 40% by weight, more preferably 25 to 40% by weight, based on the dry weight of the resin.

The halogen-containing porous resin has continuous open pores, and its porosity corresponds to a specific surface area, measured by the BHT method ($N_2$), of about 200 to about 600 m$^2$/g, preferably 400 to 600 m$^2$/g, based on the dry weight of the resin. The continuous open pores show a pore volume (dry base), determined by the mercury penetration method, of about 0.3 to about 1.0 ml/g.

Advantageously, the halogen-containing porous resin is used in the form of particles having an average particle diameter of about 0.1 to 0.5 mm in the method of this invention. The average particle diameter, as used herein, denotes the size of openings of a sieve which permit 10% of the entire resin to pass through the openings and 90% of the resin to be left on the sieve.

Examples of the halogen-containing porous resin which can be suitably used in the invention include halogenation products of crosslinked polymers of aromatic monovinyl monomers and aromatic polyvinyl monomers, crosslinked polymers of halogenated aromatic monovinyl monomers and aromatic polyvinyl monomers, and crosslinked polymers of halogenated aromatic monovinyl monomers, aromatic monovinyl monomers and aromatic polyvinyl monomers.

Styrene and vinyltoluene, for example, are suitably used as the aromatic monovinyl monomers. Examples of suitable aromatic polyvinyl monomes are divinylbenzene and trivinylbenzene. Examples of suitable halogenated aromatic monovinyl monomers are monochlorostyrene and monobromostyrene.

Illustrative of suitable halogenated products of crosslinked polymers of aromatic vinyl monomers and aromatic polyvinyl monomers are, for example, chlorinated or brominated products of styrene/divinylbenzene copolymer, styrene/trivinylbenzene copolymer, and vinyltoluene/divinylbenzene copolymer. Chlorination or bromination may be carried out, for example, by reacting the non-halogenated copolymers with molecular chlorine or molecular bromine in the presence of a catalyst such as ferric chloride or boron fluoride.

In the method of this invention, a halogenated product of styrene/divinylbenzene copolymer is particularly suitably used as the halogen-containing porous resin. Such a resin is also commercially available For example, a resin obtainable under the tradename "SEPABEADS SP207" is a brominated copolymer of styrene and vinylbenzene which has a specific gravity of about 1.2.

The method of this invention is usually practiced by packing particles of the halogenated porous resin in a column, and passing an aqueous solution of hydrogen peroxide containing organic impurities through the column thereby to contact the resin with the aqueous hydrogen peroxide solution.

The aqueous solution of hydrogen peroxide containing organic impurities may have a hydrogen peroxide concentration of about 10% to about 70% by weight, or contain organic impurities in a concentration of up to about 500 mg/liter as the total amount of organic carbon.

According to the method of this invention, the aqueous solution of hydrogen peroxide containing organic impurities may be passed as a downward flow through a column packed with the halogen-containing porous resin. Hence, the organic impurities can be efficiently removed while maintaining the resin in the most closely packed state during the passing of the aqueous hydrogen peroxide solution. Any bubbles which may occur by chance in the column during passing of the hydrogen peroxide solution can be rapidly removed from the resin layer. Accordingly, the treatment of removing the organic impurities can be carried out by passing the aqueous hydrogen peroxide solution in a stable condition without giving rise to problems such as the occurrence of a shortcut flow and the aggravation of the state of packing of the resin by bubbles. In addition, the porous adsorbent resins used in this invention have markedly increased adsorptive capacity as compared with conventional resins. For example, when used to treat the aqueous solution of hydrogen peroxide in an amount 1000 times the amount of the resin, they still retain a sufficient removing ability. The method of this invention, therefore, is very effective for purifying an aqueous solution of hydrogen peroxide by removing organic impurities therefrom in an industrial operation.

The following examples illustrate the present invention more specifically

EXAMPLE 1

Fifty milliliters of SEPABEADS SP207 (a tradename for a brominated styrene/divinylbenzene crosslinked copolymer made by Mitsubishi Chemical Industry Co., Ltd.) having a true specific gravity in the wet state of 1.2, a halogen content of 34% by weight, a specific surface area of 400 $m^2/g$, a pore volume of 0.5 ml/g and an average particle diameter of 0.3 mm was packed in a column having an inside diameter of 10 mm and a length of 30 cm. Fifty liters of a 31% by weight aqueous solution of crude hydrogen peroxide containing 40 mg/liter, as the total amount of organic carbon, of organic impurities was passed through the column as a downward flow at a space velocity of 100 $hr^{-1}$. During passing of the hydrogen peroxide solution, no occurrence of a shortcut flow was observed. Any bubbles that formed escaped rapidly from the upper or lower portion of the packed resin layer. The effect of removing the organic impurities was such that the total amount of organic carbon in the hydrogen peroxide solution was 40 mg/liter before the treatment and 5 mg/liter after the treatment.

COMPARATIVE EXAMPLE 1

Example 1 was repeated except that commercial AMBERLITE XAD-2 (made by Rohm & Haas Co.; specific gravity 1.0) was used as the porous adsorbent resin. During passing of the hydrogen peroxide solution, short circuits formed. The removing effect was such that the total amount of organic carbon in the aqueous solution of hydrogen peroxide was 40 mg/liter before the treatment and 20 mg/liter after the treatment.

COMPARATIVE EXAMPLE 2

Comparative Example 1 was repeated except that the aqueous solution of hydrogen peroxide was passed as an upward flow. The state of passing the solution was good in the initial stage of the operation. With the passage of time, however, bubbles formed and gathered in the resin layer afloat in the upper portion of the column to increase resistance, and stable treatment became difficult. The removing effect was such that the total amount of organic carbon in the aqueous solution of hydrogen peroxide was 40 mg/liter before the treatment and 15 mg/liter after the treatment.

EXAMPLE 2

A resin used in this invention (SEPABEADS SP207) and a conventional resin (AMBERLITE XAD-2) were compared in adsorbing amount in the batch method.

Five milliliters of each resin and 5 liters of a 31% by weight aqueous solution of crude hydrogen peroxide were put in a 10-liter polyethylene container, and shaken for 12 hours. The resin was separated by filtration, and the total amount (mg/liter) of organic carbon in the treated hydrogen peroxide solution was measured. For SEPABEADS SP207, it was 40 mg/liter before the treatment and 8 mg/liter after the treatment, whereas for AMBERLITE XAD-2 it was 40 mg/liter before the treatment and 25 mg/liter after the treatment.

What is claimed is:

1. A method of removing organic impurities from an aqueous solution of hydrogen peroxide, which comprises bringing an aqueous solution of hydrogen peroxide containing organic impurities into contact with a halogen-containing porous resin having a true specific gravity in the wet state of 1.1 to 1.3.

2. The method of claim 1 wherein the concentration of hydrogen peroxide in the aqueous solution of hydrogen peroxide is about 10 to about 70% by weight.

3. The method of claim 1 wherein the aqueous solution of hydrogen peroxide contains the organic impurities in a concentration of up to about 500 mg/liter as the total amount of organic carbon.

4. The method of claim 1 wherein the halogen-containing porous resin contains about 10 to about 40% by weight of halogen.

5. The method of claim 1 wherein the halogen-containing porous resin are in the form of particles having an average particle diameter of about 0.1 to about 0.5 mm.

6. The method of claim 1 wherein the halogen-containing porous resin has a specific surface area of about 200 to about 600 $m^2/g$.

7. The method of claim 1 wherein the halogen-containing porous resin has a pore volume of about 0.3 to about 1.0 ml/g.

8. The method of claim 1 wherein the halogen-containing porous resin is a chlorinated or brominated product of a styrene/divinylbenzene copolymer, a styrene/trivinylbenzene copolymer or a vinyltoluene/divinylbenzene copolymer.

* * * * *